UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

AZO DYE.

935,371.　　Specification of Letters Patent.　Patented Sept. 28, 1909.

No Drawing.　　Application filed June 22, 1909. Serial No. 503,634.

*To all whom it may concern:*

Be it known that we, PAUL JULIUS and ERNST FUSSENEGGER, doctors of philosophy and chemists, subjects of the Emperor of Austria-Hungary, residing at Ludwigshafen-on-the-Rhine, Germany, have invented new and useful Improvements in Azo Dyes, of which the following is a specification.

Our invention relates to new azo coloring matters.

We have discovered that by diazotizing 3-chlor-2-amino-1-methyl-benzene-5-sulfonic acid and combining the diazo compound with 2-naphthol, or with a sulfonic acid of 2-naphthol, new azo coloring matters can be obtained which are particularly valuable on account of their great fastness against the action of light.

The 3-chlor-2-amino-1-methyl-benzene-5-sulfonic acid used according to this invention is new and can be obtained by treating 2-acidyl-amino-1-methyl-benzene-5-sulfonic acid with chlorin in aqueous solution and then splitting off the acidyl group from the product so obtained.

The new coloring matters obtainable according to our invention are characterized by their sodium salts being soluble in water, their barium salts are insoluble in water. When dry, they consist of orange powders, in the form of their lakes they possess yellow to orange shades, and upon reduction with tin and hydrochloric acid they yield 3-chlor-2-amino-1-methyl-benzene-5-sulfonic acid and a 1.2-amino-naphthol body. The new coloring matter which we wish to be understood as claiming specifically is that obtainable by combining the aforesaid diazo compound with 2-naphthol. It yields orange lakes, and upon reduction with tin and hydrochloric acid it gives rise to 3-chlor-2-amino-1-methyl-benzene-5-sulfonic acid and 1-amino-2-naphthol.

The following example will serve to illustrate further the nature of our invention and how it can be carried into practical effect, but the invention is not confined to this example. The parts are by weight. Diazotize twenty-two and one-fifth parts of 3-chlor-2-amino-1-methyl-benzene-5-sulfonic acid in the usual manner and allow the diazo compound to run, while stirring, into a solution of fifteen parts of beta-naphthol, to which sufficient sodium carbonate has been added to maintain the whole alkaline. When the combination has taken place, complete the precipitation of the coloring matter, if necessary, by means of common salt, filter it off, and press and dry it. It is easily soluble in water, yielding an orange-yellow solution, and on the addition of barium chlorid to this solution a yellowish orange insoluble barium salt is obtained. In a similar manner, coloring matters can be obtained when a sulfonic acid derivative of beta-naphthol is employed instead of beta-naphthol.

Now what we claim is:—

1. The coloring matters which can be obtained from 3-chlor-2-amino-1-methyl-benzene-5-sulfonic acid and a hereinbefore defined 2-naphthol body, which coloring matters consist in the dry state of orange powders, their sodium salts are soluble in water, their barium salts are insoluble in water, in the form of their lakes they possess orange shades, and upon reduction with tin and hydrochloric acid they give rise to 3-chlor-2-amino-1-methyl-benzene-5-sulfonic acid and a 1.2-amino-naphthol body.

2. The coloring matter which can be obtained by combining diazotized 3-chlor-2-amino-1-methyl-benzene-5-sulfonic acid with 2-naphthol, which coloring matter consists when dry of an orange powder, its sodium salt is soluble in water, its barium salt is insoluble in water, in the form of its lakes it possesses orange shades, and upon reduction with tin and hydrochloric acid it gives rise to 3-chlor-2-amino-1-methyl-benzene-5-sulfonic acid and 1-amino-2-naphthol.

In testimony whereof we have hereunto set our hands in the presence of two subscribing witnesses.

PAUL JULIUS.
ERNST FUSSENEGGER.

Witnesses:
ERNEST G. EHRHARDT,
J. ALEC. LLOYD.